United States Patent Office 3,255,125
Patented June 7, 1966

3,255,125
DOUBLE BRIDGED BIVALENT TETRAHEDRAL METAL POLYMERS
Burton Peter Block, Wayne, and Joseph Simkin, Philadelphia, Pa., Edwin S. Roth, New Haven, Conn., and Selwyn H. Rose, Elkins Park, Pa., assignors to Pennsalt Chemicals Corporation, Philadelphia, Pa., a corporation of Pennsylvania
No Drawing. Filed Feb. 19, 1963, Ser. No. 259,715
23 Claims. (Cl. 260—2)

This application is a continuation-in-part of U.S. Serial No. 202,078 filed June 13, 1962, which application is now abandoned.

This invention relates to novel coordination polymers and, more particularly, is concerned with novel polymers involving a doubly bridged (catenated) bivalent tetrahedral metal whereby the polymer backbone is entirely inorganic. These novel polymers, because of their high temperature stability, are useful for conversion to shaped articles and as coating compositions to be employed under high temperature conditions.

In accord with the invention there is provided a polymer having the repeating units $M(Y)_2$ wherein M is a bivalent tetrahedral metal and Y is a bridging group with a charge of —1. Alternatively, the preferred solid polymers may be represented as compounds containing a plurality of recurring units having the structure

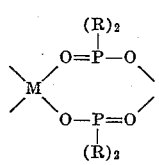

wherein M is a bivalent tetrahedral metal, and the R groups are inert organic and inorganic groups. The structure given in the above formula is in accord with conventional designations for coordination compounds. Examples of such usage can be found in "The Chemistry of the Co-ordination Compounds" by John C. Bailar, Jr., Reinhold Publishing Co., 1956, and Sidgwick's treatise "Chemical Elements and Their Compounds," Oxford University Press, 1950.

The bivalent tetrahedral metal may be any of the various metals which are characterized by having a coordination number of four in the +2 oxidation state (i.e. a tetrahedral spatial configuration). Such metals include bivalent zinc, cobalt, beryllium, manganese, mercury, nickel, iron and cadmium.

The chelating or bridging groups will have a charge of —1 and will comprise the anion of an acid $R_2P(O)OH$ which is based on the group of phosphinic acids. It is evident that for the purpose of forming the polymer backbone by bridging the metal M atoms, only two valences of each phosphorus atom are used. Thus the remaining valences of the phosphorus atom are satisfied with two R groups which may be the same or different inert organic groups such as alkyl, aryl, alkoxyl or aryloxyl radicals or inert inorganic groups such as —$NH_2$. Preferably R will be a hydrocarbon alkyl or aryl group containing from one to twelve carbon atoms, as, for example, methyl, ethyl, t-butyl, hexyl, octyl, decyl, dodecyl, phenyl, tolyl, xylyl, naphthyl, α-methyl naphthyl, and the like.

Many of the phosphinic acids which may be used as bridging groups are disclosed by Kosolapoff in his book "Organophosphorus Compounds," John Wiley, 1950.

Specific examples of the polymers of the invention include those having the following repeating units:

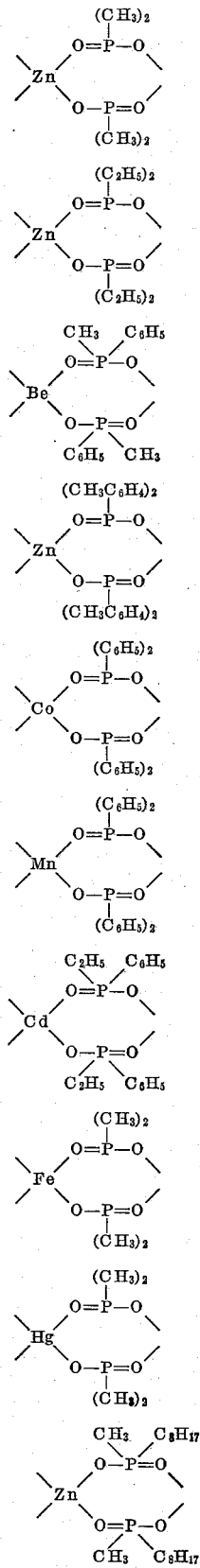

The processes by which the polymers of this invention may be made are quite straightforward. In one technique, the reaction of a phosphinic acid with a bivalent tetrahedral metal acetylacetonate is employed. This reaction proceeds readily by heating the reactants in an essentially anhydrous system with or without a basic catalyst such as pyridine. The reaction is usually conducted in refluxing benzene after which the product is recovered by evaporating the solvent. Alternatively, an alcohol or ketone (e.g. ethanol or acetone) solution may be used with the metal acetate. Another technique which may be used is a direct fusion technique in which the reactants are merely heated until fusion occurs, and the product forms. On cooling, the product is washed with one or more solvents to aid in its purification. Still another technique involves simply the high speed agitation of a homogeneous solution of the reactants. Usually a solvent such as an aliphatic alcohol (e.g. ethanol, propanol, etc.), an aromatic hydrocarbon (e.g. benzene, toluene, etc.), or ketones such as above may be used as a mutual solvent for the metal salt and the phosphinic acid reactants. As agitation proceeds the product polymer is precipitated and is separated from the reaction medium. This procedure is usually carried out at room temperature, but is operable also at higher and lower temperatures, say from about 10° C. to the refluxing temperature of the solvent used.

A preferred technique for preparing the polymers of this invention involves an interfacial polymerization technique. In this method, the bivalent tetrahedral metal salt is dissolved in one solvent and the reacting phosphinic acid compound dissolved in a second solvent immiscible with the first. With vigorous mixing or high speed agitation of the two solutions, as in a high speed blender or disperser (e.g. a Waring Blendor or a Premium High Speed Dispersator) reaction occurs at the interface of the solutions and the product solid which forms is simply separated by filtration, centrifugation or the like. Solvents which may be used include immiscible pairs such as water and benzene, water and toluene, water and xylene, water and carbon tetrachloride, and the like. The preferred system is a water-aromatic hydrocarbon pair. As with the homogeneous solution technique, this procedure is operable over a similarly wide temperature range. This technique is preferred because it tends to give a polymer having a somewhat higher molecular weight than the products obtained from the other methods. It will be understood, however, that some of the above techniques are more desirable to produce certain polymers. For example, where a beryllium-containing polymer is desired, the fusion technique appears preferable. On the other hand, the zinc-containing polymers are most often best made by the interfacial polymerization technique.

The novel polymers of this invention are solids which decompose without melting at temperatures above about 400° C., depending upon the particular polymer. The polymers are generally obtained as mixtures of various molecular weights and can be fractionated into various molecular weight ranges by solubility differences in various organic solvents. In general the molecular weight range of the polymers will be predominantly between about 2,000 and 10,000, although polymers above and below this range will be obtained during their preparation.

It is well known that certain coordination compounds possess polymeric structures characterized by double-bridging between metal atoms; for example, PdCl$_2$ and CuCl$_2$ have the structures

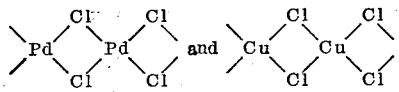

In such cases, however, the double-bridged backbone of the polymer is planar and thus is a rigid rod. On the other hand, the novel polymers of this invention have a flexible backbone because of the presence of the eight-membered ring which is absent in the prior art compounds. This eight membered ring confers some flexibility on the backbone, leading to different and often more useful properties for the novel polymers of this invention. Thus, the polymers and films obtained therefrom will be somewhat elastic and flexible instead of brittle and they can be worked and pressed to useful articles.

Also known in the art are the compounds described by W. C. Drinkard and G. M. Kosolapoff (J. Am. Chem. Soc. 74, 5520 (1952)) in which the metal atom is a planar element such as copper, e.g. Cu[OP(C$_6$H$_5$)$_2$O]$_2$. However, the polymers of this invention wherein the metal is tetrahedral are surprisingly superior in thermal stability to these copper compounds which may actually exist in polymeric form. For example, the prior art compounds disclosed as Cu[OP(C$_6$H$_5$)$_2$O]$_2$ decompose at temperatures of about 300° C., whereas the compounds of this invention are stable up to at least about 400° C. and in many instances, as for example

their stability is on the order of 500° C.

The high thermal stability of these polymers makes them of value for use at temperatures where ordinary organic polymers fail. In addition, they are capable of being molded into various shapes and forms when subjected to pressure molding at temperatures of about 300° to 350° C. Thus, these polymers will be of particular value for use under high temperature conditions as gaskets, O-rings, protective coatings, and the like. Those polymers which are colored (e.g. the cobalt derivatives) will also be of value as pigments and tints.

Example 1

An intimate mixture of 10 g. of BeCl$_2$ and 5.5 g. of (C$_6$H$_5$)$_2$P(O)OH was heated in refluxing benzene for 300 hours in a system protected from H$_2$O. The benzene, which contained suspended solid, was decanted from the unreacted mixture at the bottom of the flask and filtered to yield a tan precipitate which was washed with benzene, water and ether. The dried polymeric product contained 2.1% Be, 14.2% P, 64.70% C and 5.22% H. The calculated values for Be[OP(C$_6$H$_5$)$_2$O]$_2$ are 2.03% Be, 13.98% P, 65.2% C and 4.54% H. The product is a white powder which is stable up to 525° C. as measured on a therombalance.

Example 2

A solution of 5.2 g. of Zn(CH$_3$COCHCOCH$_3$)$_2$ in 50 ml. of pyridine was combined with a solution of 4.4 g. of (C$_6$H$_5$)$_2$P(O)OH in 20 ml. of pyridine and 30 ml. of benzene. The solution was evaporated to dryness under a nitrogen jet, treated with 35 ml. of benzene, and the resulting mixture likewise evaporated to dryness. The treatment with benzene was repeated two times. After the last treatment with benzene the mixture was filtered, not evaporated. The insoluble polymeric product weighed 4.2 g. and analyzed 12.6% Zn, 56.9% C, 3.8% H and 12.0% P; calculated for Zn[OP(C$_6$H$_5$)$_2$O]$_2$: 13.08% Zn, 57.68% C, 4.3% H, 12.40% P. The product is a white powder which shows thermal stability up to 494° C.

Example 3

A white slurry of 2.41 g. of zinc acetate dihydrate in 100 ml. of acetone was added with stirring to a solution of 2.1 g. of dimethyl phosphinic acid in 200 ml. of acetone. After complete solution, a precipitate started to form. This white precipitate was collected, washed with acetone, and dried to give a 96% yield of polymeric zinc dimethylphosphinate. Analysis: found 25.7% Zn, 19.28% C, 4.83% H and 23.31% P; calculated for ZnC$_4$H$_{12}$O$_4$P$_2$: 26.0% Zn, 19.10% C, 4.81% H and 24.63% P. This white powder melts at approximately 350° C. and is stable to approximately 445° C. on the thermobalance. Long, flexible fibers can be pulled from the melt.

Example 4

In a reaction similar to that of Example 3 a slurry of 1.10 g. of zinc acetate dihydrate in 100 ml. of ethanol was added to a solution of 1.56 g. of methylphenylphosphinic acid in 200 ml. of ethanol. There resulted 1.12 g. of a white powder which softens at 150° C. and becomes molten about 200° C. It starts to lose weight at about 415° C. in the thermobalance. The composition of the powder corresponds to polymeric zinc methylphenylphosphinate. Found: 17.7% Zn, 44.88% C, 4.56% H and 16.14% P; calculated for $ZnC_{14}H_{16}P_2O_4$: 17.46% Zn, 44.89% C, 4.31% H and 16.28% P. A number average molecular weight of 5600 was found for this product in benzene indicating a degree of polymerization of approximately 15 units. The polymer is soluble in organic solvents such as benzene, and other aromatic hydrocarbon solvents.

Example 5

An intimate mixture of 6.53 g. of $$Co(CH_3COCHCOCH_3)_3$$

and 8.0 g. of $(C_6H_5)_2P(O)OH$ was slowly heated in a nitrogen atmosphere. At about 180° C. a molten phase appeared, but at 213° C. the mixture had resolidified. It was cooled and then washed with chloroform until the washings were olive green in color. A yield of 8.45 g. of polymer analyzing 12.1% Co, 12.2% P, 58.35% C and 4.34 H was recovered; calculated for $$[Co(OP(C_6H_5)_2O)_2]_x:$$

11.95% Co, 12.56% P, 58.44% C and 4.09% H. This insoluble material is stable to approximately 440° C. in the thermobalance.

Example 6

In a similar manner to that used in Example 2, polymers may be obtained from divalent manganese, iron, nickel, mercury and cadmium acetates on reaction with diphenylphosphinic acid.

Example 7

A solution of 2.195 g. of zinc acetate dihydrate in 100 ml. of water was added to a 200 ml. benzene solution of 4.36 g. of $(C_6H_5)_2P(O)OH$ contained in a Waring Blendor. The mixture was agitated for an hour and then filtered to yield a white precipitate. The dried product weighed 4.1 g. and contained 13.4% Zn, 12.14% P, 57.61% C and 4.18% H, as compared with the calculated values of 13.08%, 12.40%, 57.68% and 4.03% respectively. The above reaction was scaled up three and one-half times, with agitation being provided by a Premier High Speed Dispersator to yield 15.3 g. of dried product.

Example 8

A solution of 4.36 g. of $(C_6H_5)_2P(O)OH$ in 250 ml. of 95% ethanol was prepared to which 4.39 g. of zinc acetate dihydrate was added. The solution was vigorously agitated for an hour. The resulting white precipitate which was obtained was separated by filtration and was washed extensively with ethanol. The dried product weighed 4.2 g. and was confirmed by analysis to be the same as the product of Example 2.

Example 9

A solution of 2.49 g. of cobalt acetate tetrahydrate in 100 ml. of water was added to a 200 ml. benzene solution of 4.36 g. of $(C_6H_5)_2P(O)OH$ contained in a Waring Blendor. The mixture was agitated for an hour and then filtered to yield a blue precipitate which is the inorganic polymer of empirical formula $Co[OP(C_6H_5)_2O]_x$.

Example 10

A solution of 1.098 g. of zinc acetate dihydrate was added to a 700 ml. benzene solution of 1.56 of $$(C_6H_5)(CH_3)P(O)OH$$

The mixture was agitated vigorously for two hours with a four-blade metal stirrer. The soluble product was recovered by evaporation of the solvent yielding 1.4 g. of a solid containing 17.4% Zn, 44.3% C, 4.4% H and 16.5% P as compared with the calculated values for $[Zn(O(CH_3)P(C_6H_5)O)_2]_n$ of 17.41% Zn, 44.77% C, 4.29% H and 16.50% P. The product has a molecular weight range of 6500 and forms long flexible fibers when molten or when wet with benzene at room temperature.

It is to be understood that the above discussion of the invention refers to both homopolymers and copolymers having a doubly bridged bivalent tetrahedral metal. Examples 1 to 10 above illustrate the homopolymers of the invention. Copolymers are obtained in a manner similar to that for homopolymers except that the polymerization is carried out with a mixture of acids. Thus, the bivalent tetrahedral metal compound is reacted with two or more different acids, as for example, with phosphinic acid derivatives of structure $R_2P(O)OH$ wherein the acids used as reactants will have different R groups. Specific acid mixtures which exemplify those that are used in the process for making copolymers include diphenylphosphinic acid and phenylmethylphosphinic acid; dimethylphosphinic acid and diphenylphosphinic acid; diphenylphosphinic acid, dimethylphosphinic acid and phenylmethylphosphinic acid; dimethylphosphinic acid and diethylphosphinic acid; ethylphenylphosphinic acid and dimethylphosphinic acid; methyloctylphosphinic acid and ethylphenylphosphinic acid; and the like. The proportions of phosphinic acid entities in the mixtures which may be used are not critical and may vary widely. The preferred copolymers, however, are generally obtained by use of a two-component phosphinic acid system wherein the mole ratios of the different phosphinic acids used range from about 1:10 to 10:1.

The copolymers of this invention will have the following repeating units:

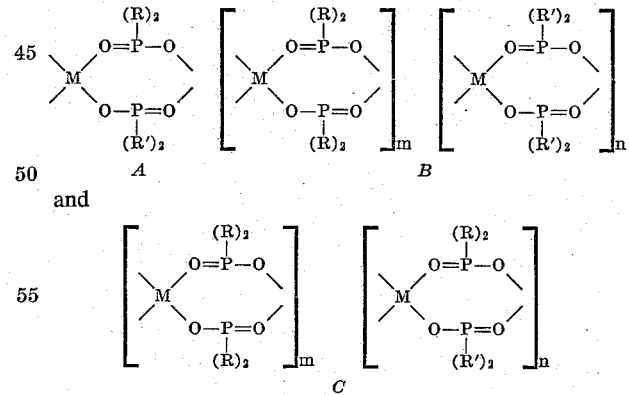

where R and R' represent different organic groups, although the repeating units of structure A will predominate particularly when the mole ratio of different acids used is in the range of 1:1. It will be understood that the R groups in the above structures are not necessarily the same and the R' groups may also represent various groups. When more than two different phophinic acids are used, the structure of the polymers will, of course, be more complex in the variations of the R groups within the polymer.

The copolymers differ from the homopolymers in that they are more easily fabricated because they have generally lower melting points and enhanced solubility in various solvents. The copolymers also frequently show greater thermal stability than the homopolymers and thus where workability with increased thermal stability is a desirable combination, the copolymers will preferably be employed. The copolymers also have the advantage of permitting the tailoring of properties for specific applications by controlling the nature and quantities of the catenating groups. Thus the copolymers of this invention offer the skilled art worker a means to prepare inorganic polymers with specifically desired properties.

It will be understood that the copolymers may be made with any of the bivalent tetrahedral metals and with any of the bridging groups discussed above. Likewise any of the processes discussed above may be used, but the copolymer will preferably be made by reacting the tetrahedral metal acetate in organic solvent solution with a mixture of the bridging group acids.

The following examples will serve to illustrate the preparation and properties of the copolymers of this invention.

Example 11

A 200 ml. ethanol solution containing 2.18 g. (10 mmoles) of $(C_6H_5)_2P(O)OH$ and 1.56 g. (10 mmoles) of $C_6H_5(CH_3)P(O)OH$ was reacted with 2.20 g. (10 mmoles) of $Zn(OCOCH_3)_2 \cdot 2H_2O$ to yield 3.8 g. of a white precipitate. The solid polymer contained 14.5% Zn, 52.8% C, 4.2% H and had a number average molecular weight of 3700 by ebulliometry in benzene. A comparison of the analysis with the calculated values of 13.08% Zn, 57.68% C and 4.03% H for $$[Zn(OP(C_6H_5)_2O)_2]_x$$

and 17.41% Zn, 44.77% C and 4.29% H for $$[Zn(OP(C_6H_5)(CH_3)O)_2]_x$$

revealed that, on the basis of the C analysis, 45.6% of the bridging groups in the polymer are $$(OP(C_6H_5)(CH_3)O)-$$

the balance of the bridging groups being $(C_6H_5)_2P(O)O^-$. The calculated percent Zn is 14.76 as compared with the value found of 14.5%.

The polymer is soluble in common organic solvents and softens at approximately 210° C. It was cast into films from benzene solution and long flexible fibers were pulled from the material while wet with benzene. The polymer is stable to 440° C. on the thermobalance.

Example 12

A 450 ml. ethanol solution containing 17.5 mmoles of $(CH_3)_2P(O)OH$ and 17.5 mmoles of $(C_6H_5)_2P(O)OH$ was reacted with 17.5 mmoles of $Zn(OCOCH_3)_2 \cdot 2H_2O$ to yield a white solid.

The polymer contained 17.3% Zn, 45.87% C, 4.9% H, 16.15% P and had a number average molecular weight of 3200 by ebulliometry in benzene. A comparison of the analysis with the calculated values of 13.08% Zn, 57.68% C, 4.03% H and 12.40% P for $[Zn(OP(C_6H_5)_2O)_2]_x$ and 26.00% Zn, 19.10% C, 4.8% H and 24.63% P for $[Zn(OP(CH_3)_2O)_2]_x$ revealed that on the basis of the C analysis 46.8% of the bridging groups are $$(OP(CH_3)_2O)-$$

The calculated values for percent Zn and percent P in the polymer are 17.0 and 16.4 respectively. This agrees well with the values of 17.3 and 16.2 found.

The polymer is soluble in common organic solvents and softens at approximately 120° C. It is stable to 430° C. on the thermobalance.

Example 13

A 700 ml. ethanol solution containing 0.624 g. (4 mmoles) of $C_6H_5(CH_3)P(O)OH$ and 6.98 g. (32 mmoles) of $(C_6H_5)_2P(O)OH$ was reacted with 3.95 g. (18 mmoles) of $Zn(OCOCH_3)_2 \cdot 2H_2O$ to yield 7.9 g. of a white precipitate. The elemental analysis revealed that 7.4% of the bridging groups are $(OP(C_6H_5)(CH_3)O)^-$. The polymer is stable to 470° C. on a thermobalance.

Example 14

A hot 250 ml. ethanol solution containing 3.27 g. (15 mmoles) of $(C_6H_5)_2P(O)OH$ and 2.35 g. (15 mmoles) of $C_6H_5(CH_3)P(O)OH$ was treated with a hot solution of 3.73 g. (15 mmoles) of $Co(OCOCH_3)_2 \cdot 4H_2O$ in 100 ml. of ethanol. The reaction product constituted polymers of varying composition, ranging from low-melting soluble polymers to high melting insoluble polymers, but included a portion soluble in chloroform that did not soften until 450° C.

It will be understood that in the practice of this invention numerous changes may be made from the description and specific examples given above without departing from the spirit and scope of the invention.

We claim:
1. A polymer having an inorganic backbone comprising a bivalent tetrahedral metal doubly bridged with a catenating group which is the anion of a phosphinic acid of the structure of $R_2P(O)OH$ where R is selected from the group consisting of alkyl, aryl, alkoxy and aryloxy containing from 1 to 12 carbon atoms.

2. A polymer having an inorganic backbone consisting of a doubly bridged bivalent tetrahedral metal wherein each of said bridging groups is the anion of an acid $R_2P(O)OH$, where R is selected from the group consisting of alkyl, aryl, alkoxy, and aryloxy containing from 1 to 12 carbon atoms, said bridging groups forming an eight-membered ring with said tetrahedral metal.

3. A polymer as in claim 2 wherein the tetrahedral metal is zinc.

4. A polymer as in claim 2 wherein the tetrahedral metal is cobalt.

5. A polymer as in claim 2 wherein the tetrahedral metal is beryllium.

6. A polymer as in claim 2 wherein the bridging groups $R_2P(O)OH$ are the same.

7. A polymer as in claim 2 wherein the bridging groups $R_2P(O)OH$ are different.

8. A polymer having an inorganic backbone wherein the repeating unit is a zinc atom doubly bridged with the anions of diphenylphosphinic acid to form an eight-membered ring.

9. A polymer having an inorganic backbone wherein the repeating unit is a zinc atom doubly bridged with the anions of dimethylphosphinic acid to form an eight-membered ring.

10. A polymer having an inorganic backbone wherein the repeating unit is a zinc atom doubly bridged with the anions of methylphenylphosphinic acid to form an eight-membered ring.

11. A polymer having an inorganic backbone wherein the repeating unit is a beryllium atom doubly bridged with the anions of diphenylphosphinic acid to form an eight-membered ring.

12. A polymer having an inorganic backbone wherein the repeating unit is a cobalt atom doubly bridged with the anions of diphenylphosphinic acid to form an eight-membered ring.

13. A polymer having an inorganic backbone wherein the repeating units consist of a zinc atom doubly bridged with the anions of at least two different acids having the structure $R_2P(O)OH$, R being selected from the group consisting of alkyl, aryl, alkoxy, and aryloxy containing from one to twelve carbon atoms.

14. A polymer having an inorganic backbone wherein the repeating units consist of a zinc atom doubly bridged with the anions of diphenylphosphinic acid and phenylmethylphosphinic acid.

15. A polymer having an inorganic backbone wherein the repeating units consist of a zinc atom doubly bridged with the anions of diphenylphosphinic acid and dimethylphosphinic acid.

16. An interfacial polymerization process in which solutions of a phosphinic acid having the structure $R_2P(O)OH$, where R is selected from the group consisting of alkyl, aryl, alkoxy and aryloxy containing from 1 to 12 carbon atoms, and a bivalent tetrahedral metal salt dissolved in immiscible solvents are reacted under conditions of vigorous mixing whereby a polymer having an inorganic backbone is precipitated.

17. A process as in claim 16 wherein the immiscible solvents are water and an aromatic hydrocarbon.

18. The process of preparing a polymer having an inorganic backbone which comprises vigorously agitating a mixture of an aqueous solution of the salt of a bivalent tetrahedral metal and an aromatic hydrocarbon solution of a phosphinic acid having the structure $R_2P(O)OH$, where R is selected from the group consisting of alkyl, aryl, alkoxy and aryloxy containing from 1 to 12 carbon atoms, and separating the polymer which precipitates.

19. The process of claim 18 wherein the tetrahedral metal salt is zinc acetate.

20. The process of claim 18 wherein the tetrahedral metal salt is cobalt acetate.

21. The process of claim 18 wherein the metal salt is zinc acetate and the phosphinic acid is diphenylphosphinic acid.

22. The process of claim 18 wherein the metal salt is cobalt acetate and the phosphinic acid is diphenylphosphinic acid.

23. The process of claim 18 wherein the metal salt is zinc acetate and the phosphinic acid is methylphenylphosphinic acid.

References Cited by the Examiner

Block et al.: "Inorganic Chemistry," vol. 1, November 1962, pp. 860–3.

Block et al.: "Jour. American Chem. Soc.," vol. 84, August 1962, pp. 3200–1.

Coates et al.: "Jour. Chem. Soc.," London, June 1962, pp. 2523–5.

SAMUEL H. BLECH, *Primary Examiner.*